United States Patent [19]

Howell

[11] Patent Number: 4,517,514
[45] Date of Patent: May 14, 1985

[54] VIBRATION TRANSDUCER WITH DUAL OPPOSED MAGNETIC ASSEMBLIES AND COUNTERBALANCED MASS

[75] Inventor: Edward B. Howell, Carmel, Calif.

[73] Assignee: Design Professionals Financial Corporation, Monterey, Calif.

[21] Appl. No.: 429,640

[22] Filed: Sep. 30, 1982

[51] Int. Cl.³ .................... G01B 7/14; G01R 33/038; G01H 11/00; H04R 11/00
[52] U.S. Cl. .................................... 324/207; 73/652; 324/228; 367/185
[58] Field of Search ........................ 324/200, 207–209, 324/226, 228; 73/517 R, 517 AV, 518, 519, 649, 652; 335/219, 220, 222, 298, 306, 229; 367/182, 185–187, 189

[56] References Cited

U.S. PATENT DOCUMENTS

| 2,985,823 | 5/1961 | Wright | 324/207 |
| 3,065,456 | 11/1962 | Alexander | 367/182 |
| 3,477,280 | 11/1969 | Blackmer | 324/207 UX |
| 3,593,258 | 7/1971 | Slavens | 367/182 |
| 3,835,427 | 9/1974 | Breitbach | 367/185 X |
| 4,051,718 | 10/1977 | Meckl et al. | 367/182 X |
| 4,282,484 | 8/1981 | Morrow | 324/207 |
| 4,314,202 | 2/1982 | Okubo | 324/207 |

Primary Examiner—Gerard R. Strecker
Attorney, Agent, or Firm—Townsend and Townsend

[57] ABSTRACT

A magnetically suspended magnetic transducer has a first magnetic assembly including a first magnetizable housing with a bottom and upstanding walls defining an interior volume, a pair of opposed, mutually spaced magnets with a pole piece in between, and a coil in the interior volume in flux cutting relationship with the additive magnetic fields generated by the magnetic pair. The second assembly is magnetically suspended above the first assembly and includes a second housing with a closed top and downwardly depending side walls partially surrounding the side walls of the first housing, an additional magnet secured to the inner top surface in opposing magnetic relation to the closest one of the pair of magnets in the first assembly so that the magnetic forces urge the second housing away from the first. A mass secured within the second housing provides a weight of sufficient magnitude to counteract the magnetic force of repulsion tending to separate the two assemblies.

8 Claims, 3 Drawing Figures

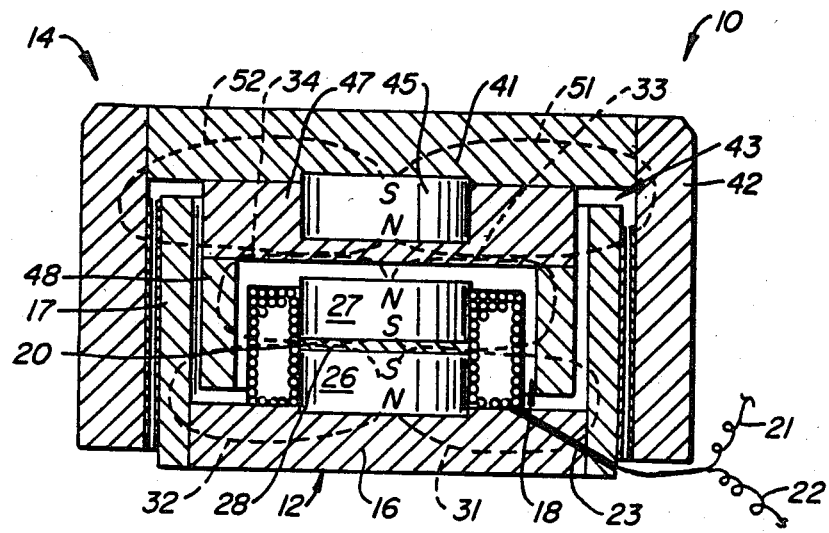
FIG.__1.
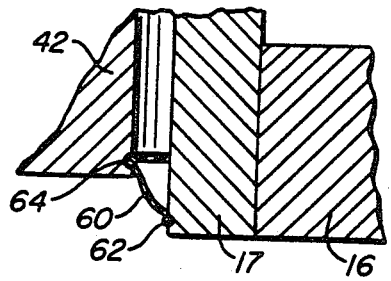
FIG.__2.
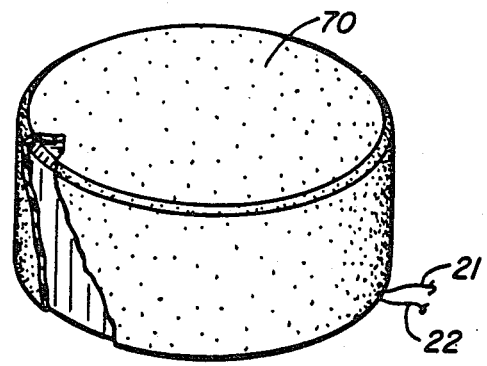
FIG.__3.

VIBRATION TRANSDUCER WITH DUAL OPPOSED MAGNETIC ASSEMBLIES AND COUNTERBALANCED MASS

FIELD OF THE INVENTION

This invention relates to magnetic transducers of the type used to generate electrical signals from vibratory motion and vice versa.

BACKGROUND OF THE INVENTION

U.S. Pat. No. 4,314,202 issued Feb. 2, 1982 for a "Flexural Vibration Sensor With Magnetic Field Generating And Sensing" discloses a magnetic transducer having a pair of opposed magnets secured in a magnetizable housing and a coil also secured within the housing in a position to intercept radially extending magnetic flux resulting from the additive combination of the fields from each magnet. This basic improved transducer is disclosed for use in measuring the flexural vibration of an associated structural member to which the sensor is magnetically adhered by virture of the fact that the coil senses variations in the strength of that portion of the magnetic field extending to the exterior of the housing as the associated structural member undergoes vibratory motion, which varies the air gap between the structural member and the exposed face of one of the two opposed magnetic field generating means. This transducer exhibits virtually noise-free, temperature insensitive performance, and omnidirectional response in the plane of the bottom contact surface, and, as noted in the patent, has a wide variety of uses.

SUMMARY OF THE INVENTION

The invention comprises an improvement over the transducer described above which incorporates all of the advantages of the basic transducer and provides several additional advantages.

The invention comprises a first magnetic assembly including a first magnetizable housing having a bottom and upstanding side walls defining a first upwardly opening interior volume. A pair of opposed, mutually spaced magnets are secured within the interior volume, the magnets being surrounded by a coil also secured in the interior volume in flux cutting relationship with the magnetic fields generated by the magnet pair. A second assembly is magnetically suspended above the first assembly, the second assembly including a second housing having a closed top and downwardly depending side walls partially surrounding the side walls of the first housing, the first and second housings preferably having cylindrical geometry. The second housing has an additional magnet secured to the inner surface of the top in opposing magnetic relation to the proximate one of the pair of magnets secured to the interior of the first housing so that the magnetic forces urge the second housing away from the first. A mass secured within the second housing provides a gravitational force of sufficient magnitude to counteract the magnetic force of repulsion tending to separate the two assemblies. The mass is preferably secured to the inner surface of the second housing top in surrounding relation to the additional magnet and is provided with downwardly depending walls tending to lower the center of mass of the second housing to provide additional mechanical stability for the transducer.

The outer surface of the first housing side walls and the inner surface of the second housing side walls are preferably provided with a low friction coating in order to facilitate relative motion therebetween. In addition, a seal may be provided for the annular gap between the inner and outer housings, if desired, to prevent the ingress of contaminants to the interior of the transducer. Alternatively, the transducer is surrounded by a jacket made of rubber, resilient plastic or the like, for the same purpose and also to prevent complete physical separation of the two major transducer subassemblies.

The invention provides a highly mechanically stable transducer suitable for use in a wide variety of applications, for example as a geophone, the active or passive feedback portion of a servomechanism, as a force transducer for a vibrating table, or the like.

For a fuller understanding of the nature and advantage of the invention, reference should be had to the ensuing detailed description taken in conjunction with the accompanying drawings.

BRIEF DESCRIPTION OF THE DRAWINGS

FIG. 1 is a longitudinal sectional view of a preferred embodiment of the invention;

FIG. 2 is an enlarged detailed view showing a seal for the transducer of FIG. 1; and FIG. 3 is a perspective view, partially broken away, showing a jacket for the transducer of FIG. 1.

DESCRIPTION OF THE PREFERRED EMBODIMENT

Turning now to the drawings, FIG. 1 is a longitudinal sectional view illustrating the preferred embodiment of the invention. As seen in this Figure, a transducer generally designated by reference numeral 10 includes a first lower assembly 12 and a second upper assembly 14. Lower assembly 12 includes a housing having right circular cylindrical geometry along the vertical axis and having a solid bottom portion 16 and a generally annular side wall portion 17 secured to the bottom 16 or formed integrally therewith. This lower housing is fabricated from any easily magnetizable material, such as soft iron, and defines an interior recess generally designated by reference numeral 18.

Secured to the top surface of bottom wall 16 within recess 18 is a cylindrical electrically conductive coil 20 having a pair of conductor leads 21, 22 passing through an aperture 23 to the exterior of the transducer.

Also secured within recess 18 are a pair of cylindrical permanent magnets 26, 27 arranged in spaced mutually opposed magnetic relation, with a pole piece 28 positioned therebetween. Pole piece 28 may be fabricated from the same material as the bottom 16. Lower magnet 26 produces a generally toroidal lower magnetic field indicated by broken lines 31, 32 which follows a first magnetic path extending from the lower (north) pole face, radially outwardly of bottom 16, upwardly along the lower portion of side wall 17, and radially inwardly through coil 20 to the upper (south) pole face of magnet 26.

Upper magnet 27 produces a generally toroidal magnetic field indicated by broken lines 33, 34 which extends upwardly from the upper (north) pole face of magnet 27, radially outwardly towards the upper portion of side wall 17, downwardly therealong, and radially inwardly through coil 20 to the lower (south) pole face of magnet 27. As will be evident to those skilled in the art, the magnetic fields from magnets 26, 27 additively combine in the annular region of coil 20 surrounding the pole piece 28.

The upper assembly includes an outer housing having a solid top 41 and a cylindrical outer wall portion 42 defining a recess generally designated by reference number 43. An additional cylindrical permanent magnet 45 is secured to the lower surface of top 41 in opposing relation to magnet 27. Surrounding upper magnet 45 is a right circular cylindrical mass 47 having downwardly depending wall portions 48 received in the gap between wall 17 and coil 20. The downwardly depending wall portions 48 serve to lower the center of mass of the upper assembly to provide additional mechanical stability. Mass 47 is preferably fabricated from Mallory 1000, a tungsten based non-magnetic very dense material. By varying the total weight of mass 47, the stiffness of the suspension and thus the natural frequency of vibration can be changed.

Magnet 45 generates a generally toroidal magnetic field indicated by broken lines 51, 52 which extends radially outwardly from the lower (north) pole face of magnet 45 through side wall 17, upwardly through side wall 42, radially inwardly through top 41 to the upper (south) pole face of magnet 45.

With the device assembled as shown in FIG. 1, the magnetic force of repulsion between magnets tending to separate the upper and lower assemblies is counterbalanced by the total mass of the upper assembly, including mass element 47. By tailoring the dimensions of this element, the transducer can be provided with a sufficient amount of steady state vertical separation required for any specific application.

In use, with the transducer placed on the ground, for example, seismic vibrations will cause relative motion between the upper and lower assemblies. As the separation distance changes, the interaction between the confronting magnetic fields generated by magnets 27 and 45 result in a variation in the magnitude of the additive magnetic fields in the region of coil 20. This causes the generation of an electrical signal on the output leads 21, 22, which is then coupled to a suitable measuring instrument, such as a volt meter, an oscilloscope or the like.

To reduce frictional losses during relative motion between the two assemblies, the inner surface of outer wall 42, and the outer surface of inner wall 17 are coated with a low friction material, such as Teflon, which reduces sliding friction therebetween.

If desired, the interior volume of the transducer may be sealed to prevent contaminating fluids, particulate matter or the like from entering the unit. FIG. 2 shows a first embodiment of a seal for the gap between the inner and outer walls. As seen in this Fig., a flexible annular rubber seal 60 is secured at the inner circumference to the lower outside edge of the inner wall 17 by means of a metal clip ring 62. The outer circumference of seal 60 is secured to the lower inside edge of outer wall 42 by a similar metal clip ring 64. Seal 60 should be sufficiently pliant to introduce only minimal resistance to the relative motion between the upper and lower subassemblies in the vertical direction.

FIG. 3 illustrates a different type of seal for the transducer, which comprises a pliant flexible thin encapsulating jacket 70 having a small aperture through which the output leads 21, 22 extend. Jacket 70 may also serve as an enclosure for the transducer during non-use.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. A magnetic transducer comprising:
   a first magnet assembly including a first magnetizable housing having a bottom and upstanding sidewalls defining a first upwardly opening interior volume with a central body axis normal to said bottom, a pair of magnetic field generating means secured within said first volume with the opposite poles of each field generating means aligned along said axis, a like polarity pole of each said pair being arranged in confronting relation, and coil means secured in said interior volume in flux cutting relationship with the magnetic fields generated by said pair; and
   a second magnetic assembly arranged above said first magnetic assembly, said second magnetic assembly including a second magnetizable housing having a top and downwardly depending sidewalls partially surrounding the sidewalls of said first housing, an additional magnetic field generating means secured to the inner surface of said top, the facing poles of said additional magnetic field generating means and the proximate one of said pair of magnetic field generating means having the same polarity so that said first and second magnetic assemblies are mutually magnetically repelled with mutual motion therebetween being confined by said sidewalls to motion substantially along said axis, and a mass secured to said second housing for providing a force of sufficient magnitude to counteract the magnetic force of repulsion between said first and second magnetic assemblies.

2. The combination of claim 1 further including a pole piece positioned between said pair of magnetic field generating means.

3. The combination of claim 1 wherein said first and second housings, said coil and said mass are all cylindrical with a common axis of symmetry coincident with said central body axis.

4. The combination of claim 1 wherein said magnetic field generating means each comprises a permanent magnet.

5. The combination of claim 1 wherein said mass is secured to the inner surface of said top in surrounding relationship to said additional magnetic field generating means.

6. The combination of claim 1 wherein the outer surface of said first housing sidewalls and the inner surface of said second housing sidewalls are provided with a low friction coating.

7. The combination of claim 1 further including seal means secured between the sidewalls of said first and second housings for sealing the interior of said transducer.

8. The combination of claim 1 further including a fluid tight jacket surrounding said transducer.

* * * * *